United States Patent
Shalagina et al.

(10) Patent No.: US 11,345,847 B2
(45) Date of Patent: May 31, 2022

(54) TREATMENT FLUID, METHOD FOR FORMATION TREATMENT, METHOD FOR REDUCING THE PROPPANT SETTLING RATE IN THE FORMATION TREATMENT FLUID

(71) Applicant: SCHLUMBERGER TECHNOLOGY CORPORATION, Sugar Land, TX (US)

(72) Inventors: Anastasia Evgenyevna Shalagina, Koltsovo (RU); Elizaveta Andreevna Inozemtseva, Novosibirsk (RU)

(73) Assignee: Schlumberger Technology Corporation, Sugar Land, TX (US)

(*) Notice: Subject to any disclaimer, the term of this patent is extended or adjusted under 35 U.S.C. 154(b) by 71 days.

(21) Appl. No.: 16/322,586

(22) PCT Filed: Aug. 1, 2016

(86) PCT No.: PCT/RU2016/000496
§ 371 (c)(1),
(2) Date: Feb. 1, 2019

(87) PCT Pub. No.: WO2018/026294
PCT Pub. Date: Feb. 8, 2018

(65) Prior Publication Data
US 2019/0203109 A1 Jul. 4, 2019

(51) Int. Cl.
*E21B 43/267* (2006.01)
*C09K 8/80* (2006.01)
(Continued)

(52) U.S. Cl.
CPC ............... *C09K 8/80* (2013.01); *C09K 8/68* (2013.01); *C09K 8/70* (2013.01); *C09K 8/88* (2013.01);
(Continued)

(58) Field of Classification Search
CPC .............. E21B 43/267; C09K 2208/08; C09K 2208/30; C09K 8/68; C09K 8/70; C09K 8/80; C09K 8/88; C09K 8/92
See application file for complete search history.

(56) References Cited

U.S. PATENT DOCUMENTS 2,726,207 A 12/1955 Healey
3,493,425 A 2/1970 Campbell
(Continued)

FOREIGN PATENT DOCUMENTS

CN 101389728 A 3/2009
CN 103289656 A 9/2013
(Continued)

OTHER PUBLICATIONS

Momentive, Safety Data Sheet, retrieved Apr. 16, 2021 from https://www.essentialingredients.com/msds/Element%2014% 20PDMS%20350.pdf (Year: 2018).*
(Continued)

*Primary Examiner* — Angela M DiTrani Leff

(57) ABSTRACT

A fluid and a method for treating a subterranean formation penetrated by a wellbore. The method provides for injecting a treatment fluid for hydraulic fracturing, wherein the treatment fluid contains a low viscosity carrier fluid, a proppant dispersed in the low viscosity carrier fluid and a fiber blend with different stiffnesses that have silicone finishing. The method provides for improved dispersion of fibers, reduces the proppant settling rate and reduces the probability of fiber bridging in hydraulic fractures.

18 Claims, 2 Drawing Sheets

(51) Int. Cl.
*C09K 8/88* (2006.01)
*C09K 8/92* (2006.01)
*C09K 8/68* (2006.01)
*C09K 8/70* (2006.01)

(52) U.S. Cl.
CPC .............. *C09K 8/92* (2013.01); *E21B 43/267* (2013.01); *C09K 2208/08* (2013.01); *C09K 2208/30* (2013.01)

(56) References Cited

U.S. PATENT DOCUMENTS

| | | | |
|---|---|---|---|
| 4,725,635 | A | 2/1988 | Okada et al. |
| 4,796,702 | A | 1/1989 | Scherubel |
| 5,173,201 | A | 12/1992 | Coffindaffer et al. |
| 5,707,939 | A | 1/1998 | Patel |
| 6,136,215 | A | 10/2000 | Evans et al. |
| 7,275,596 | B2 | 10/2007 | Willberg et al. |
| 7,380,600 | B2 | 6/2008 | Willberg et al. |
| 7,380,601 | B2 | 6/2008 | Willberg et al. |
| 7,398,829 | B2 | 7/2008 | Hutchins et al. |
| 7,581,590 | B2 | 9/2009 | Lesko et al. |
| 7,833,950 | B2 | 11/2010 | Willberg et al. |
| 8,066,068 | B2 | 11/2011 | Lesko et al. |
| 8,167,043 | B2 | 5/2012 | Willberg et al. |
| 8,230,925 | B2 | 7/2012 | Willberg et al. |
| 8,291,978 | B2 | 10/2012 | Hutchins et al. |
| 8,448,706 | B2 * | 5/2013 | Hughes ................. C09K 8/805 166/280.2 |
| 8,490,700 | B2 | 7/2013 | Lesko et al. |
| 8,636,065 | B2 | 1/2014 | Lesko et al. |
| 8,657,002 | B2 | 2/2014 | Willberg et al. |
| 8,728,450 | B2 | 5/2014 | Uehara |
| 8,776,882 | B2 * | 7/2014 | Shindgikar ........... E21B 33/138 166/281 |
| 9,163,496 | B1 | 10/2015 | Kelly et al. |
| 9,173,830 | B1 | 11/2015 | Fanizza et al. |
| 9,663,706 | B2 | 5/2017 | Fu et al. |
| 2005/0244641 | A1* | 11/2005 | Vincent .................... C09K 8/68 428/403 |
| 2007/0032155 | A1 | 2/2007 | Patterson |
| 2007/0197402 | A1 | 8/2007 | Oneil et al. |
| 2010/0272994 | A1* | 10/2010 | Carlson .................... D01F 8/04 428/401 |
| 2010/0307747 | A1* | 12/2010 | Shindgikar .............. C09K 8/03 166/276 |
| 2012/0186828 | A1* | 7/2012 | Lively ................. E21B 17/1028 166/381 |
| 2013/0066617 | A1* | 3/2013 | Weng ...................... E21B 43/26 703/10 |
| 2016/0053163 | A1* | 2/2016 | Nguyen .................. E21B 43/26 166/280.2 |
| 2017/0037305 | A1 | 2/2017 | Shalagina et al. |
| 2017/0037306 | A1 | 2/2017 | Shalagina et al. |
| 2017/0145301 | A1* | 5/2017 | Roper ................... E21B 43/267 |
| 2017/0321112 | A1 | 11/2017 | Lecerf et al. |

FOREIGN PATENT DOCUMENTS

| | | |
|---|---|---|
| WO | 2015160275 A1 | 10/2015 |
| WO | 2015160277 A1 | 10/2015 |
| WO | 2015169344 A1 | 11/2015 |
| WO | 2016064593 A1 | 4/2016 |
| WO | 2016072877 A1 | 5/2016 |
| WO | 2016097789 A1 | 6/2016 |

OTHER PUBLICATIONS

International Search Report English translation issued in International Patent Appl. No PCT/RU2016/000496 dated May 11, 2017; 2 pages.

\* cited by examiner

TREATMENT FLUID, METHOD FOR FORMATION TREATMENT, METHOD FOR REDUCING THE PROPPANT SETTLING RATE IN THE FORMATION TREATMENT FLUID

FIELD OF THE DISCLOSURE

The technical solution relates to the oil-and-gar industry, in particular, to stimulation of a subterranean formation by hydraulic fracturing, and to a composition for hydraulic fracturing operations.

BACKGROUND

Fibers as additives in a drilling fluid or a hydraulic fracturing fluid are widely used to change the fluid rheology. Dispersion of fibers with length of approximately 1-12 mm is introduced into a polymer-thickened fracturing fluid to reduce the proppant settling rate, i.e., to improve the transport properties deeper into a hydraulic fracture during the stage of proppant placement. Also, dispersed fibers are added to treatment fluids in order to decrease fluid losses in the high-permeability well zones (fluid diversion slugs).

In some hydraulic fracturing operations, low viscosity fluids with addition of slickwater are employed. During such hydraulic fracturing operations, aggregation of fibers (i.e., low dispersion capacity of fibers) and fiber plugging of channels (also known as "fiber bridging") reduces fracturing fluid influx into a produced fracture, thus reducing the efficiency of the entire formation treatment operation. It is especially noticeable for the rocks where a hydraulic fracturing operation produces a network of narrow fractures with an increased probability of fiber bridging.

A composition with fibers comprising a silicone polymer in the form of an additive into material (within the range from 0.1% to 20%) ensures reduction of undesirable fiber bridging, and such composition is described in WO 2015160275. It has been shown that fibers modified by a silicone additive have a substantially low threshold for the injection rate of fiber suspension. That is, a hydraulic fracturing operation is not accompanied by fiber plugging in flowpaths, for example, in narrow (approximately 1-3 mm) hydraulic fractures. A low viscosity fluid with a low concentration of slickwater is used as a carrier fluid. The viscosity of such carrier fluid is selected to be less than 50 mPa-s.

Low dispersion capacity of fibers in preparation of treatment fluid presents an obstacle for efficient hydraulic fracturing. If fibers in fluid stick together and form bundles while blending the fluid, the proppant particles settle faster in fracturing fluid, and the probability of plugging and bridging inside downhole equipment components (pumps and valves) during injection of fluid with fibers increases.

It is also noted that many types of polymer or natural fibers have short storage life, since absorbed water facilitates consolidation (coalescence) of separate fibers into bundles of fibers, which are then difficult to disperse back into uniform dispersion.

The present disclosure describes a method that provides high dispersability of fibers in a fluid at the stage of preparation and injection of treatment fluid into a well. In addition, it presents a method that improves the behavior of the treatment fluid, so that a fluid comprising dispersed fibers is hardly prone to fiber bridging during fluid circulation in a wellbore. As this takes place, addition of fibers into the fluid ensures reduction of the proppant settling rate in the fluid. Therefore, the present disclosure provides a method for improving technologies that increase the dispersability of fibers in a low viscosity carrier fluid and reduce the possibility of fiber bridging of hydraulic fractures.

SUMMARY

According to different embodiments, the treatment fluids and methods, when using fibers in a low viscosity carrier fluid, ensure a high dispersion capacity of various-type fiber suspension and ensure reducing proppant settling, while ensuring low proneness to fiber bridging.

The present disclosure describes a treatment fluid comprising a low viscosity carrier fluid with viscosity less than 50 mPa-s at a shear rate of 170 $sec^{-1}$ and a temperature of 25° C. that also contains a proppant dispersed in the low viscosity carrier fluid and fibers (polymer and natural) dispersed in the low viscosity carrier fluid. Dispersed fibers are distinguished by rigidity, while at least 40% of fibers have silicone finish. Finishing can be performed by aerosol application of silicone-comprising liquids onto chopped fibers.

The present disclosure also describes a method for treating a subterranean formation penetrated by a wellbore. The present disclosure describes a treatment fluid comprising a low viscosity carrier fluid with viscosity less than 50 mPa-s at a shear rate of 170 $sec^{-1}$ and a temperature of 25° C. that also contains a proppant dispersed in the low viscosity carrier fluid and fibers (polymer or natural) dispersed in the low viscosity carrier fluid. Dispersed fibers are distinguished by rigidity, while at least 40% of fibers have silicone finish. Then, according to the method, the treatment fluid is injected at an effective flow rate to prevent fiber bridging in the well.

The present disclosure also describes a method for reducing the proppant settling rate in a low viscosity fluid circulating through the wellbore. The method provides for injection of a low viscosity carrier fluid with viscosity less than 50 mPa-s at a shear rate of 170 $sec^{-1}$ and a temperature of 25° C., a proppant dispersed in the low viscosity carrier fluid and fibers dispersed in the low viscosity carrier fluid. The fibers are presented by fibers distinguished by their stiffness, while at least 40% of fibers have silicone finishing. Further, the method provides for injecting the treatment fluid in an effective amount for reducing the proppant settling rate and maintaining the fluid circulation rate to prevent fiber bridging.

DETAILED DESCRIPTION

Figure 1A:
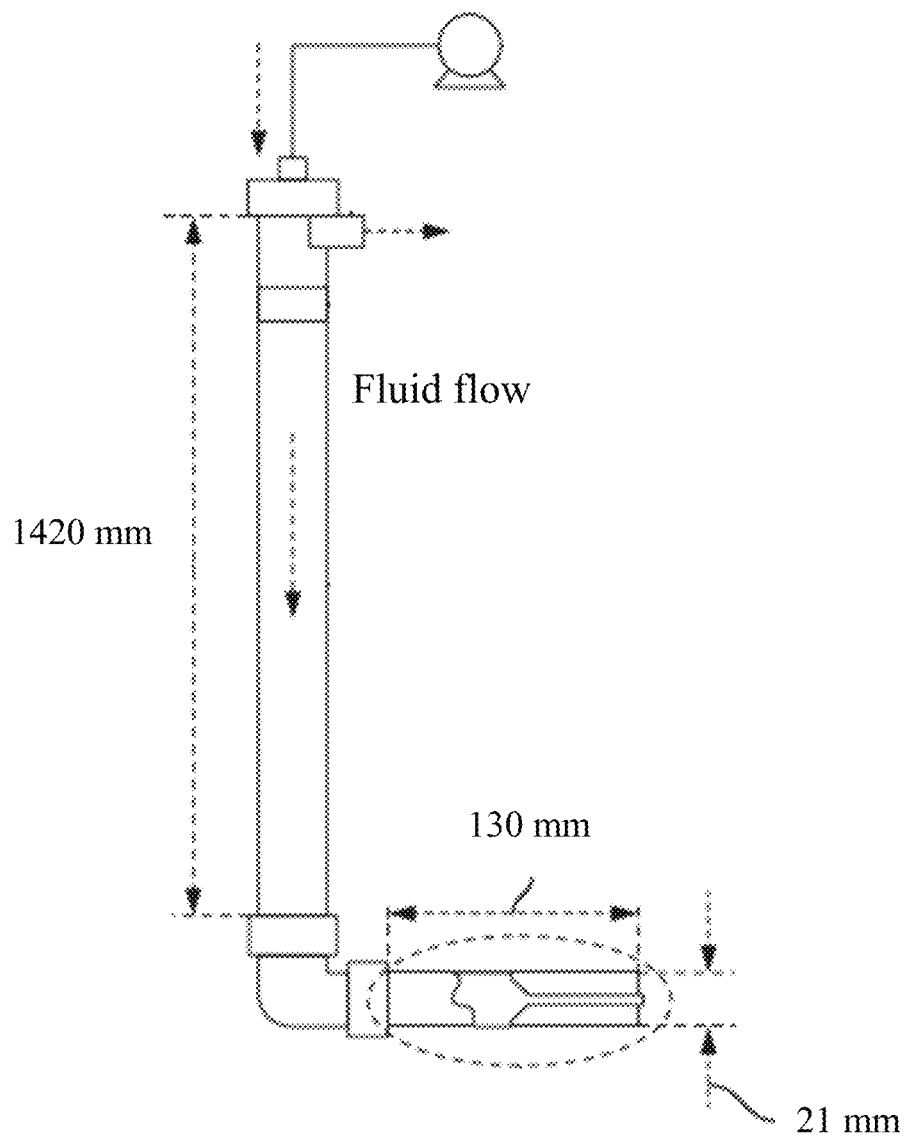
FIG. 1A shows a diagram of a test unit with a flowpath to test fluid for the fiber bridging effect.

For a better understanding of the principles of this disclosure, reference is made to some representative embodiments. As used herein, the term "embodiments" means non-limiting examples that can be applied separately or in combination with other embodiments. Also, it should be understood that the described embodiments of this disclosure do not place any limitations on the breadth of protection so any variations or modifications of the disclosed variants of fluid or methods are possible, as can be appreciated by a person of ordinary skill in the art.

Also, it should be understood that while the most part of the detailed description relates to the hydraulic fracturing operations, this solution can also be applied for other operations used in the oil and gas production such as, for example, cementing, creation of gravel packs, flushing, and in other fields apart from the oil and gas industry, where the advantages of this disclosure can be implemented.

Within the scope of the described embodiments, the treatment fluid contains a low viscosity carrier fluid, a proppant carried by the carrier fluid and a blend of at least two types of fibers dispersed in the carrier fluid. In this description, the term "low viscosity fluid" means a fluid with the viscosity less than 50 mPa-s measured at a shear rate of 170 sec$^{-1}$ and a temperature of 25° C. Such fluid differs from the conventional (viscous) fracturing fluid, where a linear gel or a crosslinked gel having the viscosity that is tens to hundreds of times higher is used to transfer the proppant. A high viscosity of polymer gel in the conventional fracturing fluid markedly reduces the settling rate of solid particles with a density higher than the density of carrier fluid (Stokes' law).

In different embodiments of this disclosure, the treatment fluid contains a proppant dispersion in a weight concentration in the range from 0.01 to 1 kg/L of the total volume of carrier fluid (or in the range from 0.1 to 8.3 ppa), or in the range from 0.12 to 0.48 kg/L of proppant per the total volume of fluid (from 1 to 4 ppa). Here, the load of proppant in the fluid is expressed as the weight of proppant added to the predetermined volume of the resulting fluid given in metric units, i.e., in kg/L, or in nonmetrical field units (ppa=pounds of proppant added per gallon of fluid). Typical varieties of proppant include ceramic proppant, calibrated sand, bauxites, glass balls, ground shells of nuts, proppant made of rigid polymer material, or blends thereof.

In different embodiments of this disclosure, an effective amount of blend of two types of fibers added to a carrier fluid is sufficient to delay (suspend) proppant settling. For example, such delayed proppant settling is detected quantitatively based on the observed pattern of proppant distribution under static conditions at a temperature of 25° C. for 90 minutes. During such test procedure, a polymer-thickened fluid with a dispersed proppant is placed into a transparent measuring cylinder, and the location of the upper boundary of the lower fluid with proppant visible is marked using time marks. This upper boundary of the proppant presence in the fluid (dispersion) is recorded in standard time intervals under unchanged external conditions. The proportion of the settled proppant is calculated from the following formula:

The proportion of the settled proppant=[initial level of proppant ($t$=0)]−[upper level of proppant at the time $n$]/[initial level of proppant ($t$=0)]−[final level of proppant ($t$=∞)]

It is believed that dispersed fibers in a carrier fluid reduce proppant settling, if the proportion of settled proppant at the selected time is lower than that for the same system, but in a fiber-free dispersion. In most examples, the static test for proppant settling after 90 minutes at room temperature gives the proportion of settled proppant below 50%.

When solid particles, fibers or blends thereof are injected through narrow channels at certain (low) rates, the fibers form a permeable network of fibers, which partially restricts fluid influx through the channels. (When the rates are high, flow washes the fiber network out of the narrow channel, i.e., plugging of channel becomes impossible). As this takes place, due to partial channel closure, the static pressure of fluid in the upstream downhole region drastically increases (which is indicative of channel plugging). In the oil-and-gas industry, such behavior of fiber dispersion is called "fiber bridging".

For example, a method for enhancing fiber bridging in flowpaths is used to reduce losses of drilling fluid in fractured rock, as described in patent RU 2569386. In such applications, fiber bridging is a useful effect that is employed to reduce circulation of drilling fluid in large fractures, where the fibers of the required length and concentration can be delivered.

However, during a hydraulic fracturing operation, such accumulation of fibers in narrow spaces of fracture is an undesirable phenomenon, since it prevents fluid injection and hydraulic fracture propagation. So far, a wide application of fluids with fibers in the oil industry is restrained due to the probability of fiber bridging (plugging) and interruption of operation. Within the scope of this disclosure, the composition of treatment fluid and methods for control of undesirable fiber bridging during hydraulic fracturing operation are described.

An efficient instrument for reducing fiber bridging during hydraulic fracturing operation is finishing (surface treatment) of fibers by silicone fluid ("silicone finishing"). Finishing of fibers by hydrophilic or hydrophobic liquid agents has long been known in the textile industry where this approach is employed to improve surface properties of fibers and threads. In particular, surface finishing of polymer fibers is performed to improve sliding between continuous fiber and textile machinery elements (to avoid yarn break when the load on fiber is high). In addition, finishing of fibers at final production stages results in imparting the following useful properties such as: antistatic, fire-protection and water-repellent properties to polymer fibers.

Silicone-finished fibers have lower friction upon coming into contact between each other or with the walls of hydraulic fracture compared to untreated fibers. Silicone-finished fibers are selected from the class of polymer or mineral fibers having different stiffnesses (binary fiber blend is used). Binary blend of silicone-finished fibers in a sufficient concentration ensures reducing the proppant settling rate in a low viscosity carrier fluid, in particular, when the proppant settling rate is measured in the course of static test or evaluated by testing in horizontal channel flow at a fluid flow rate no more than 0.1 m/s.

Figure 1B:
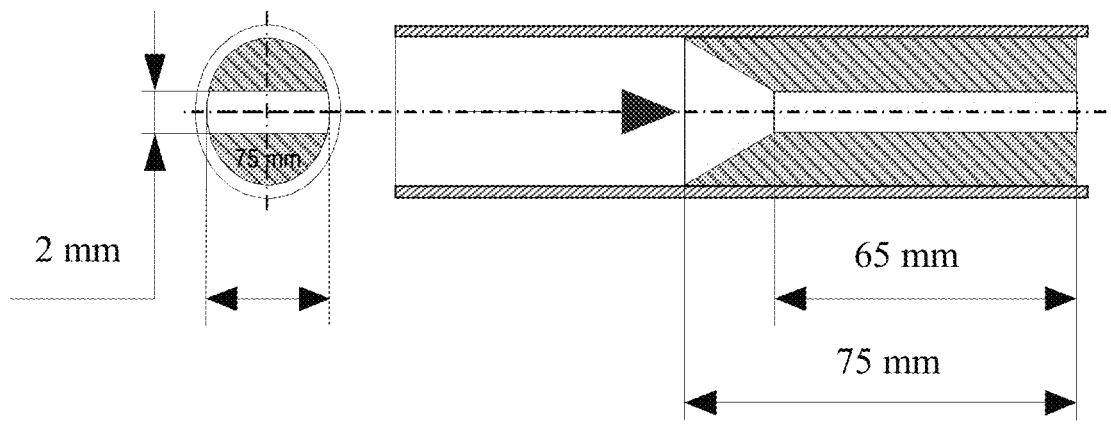
FIG. 1B shows an enlarged view of the flowpath in the test unit depicted in FIG. 1A.

To find the intervals between parameters of treatment fiber fluid injection without the fiber bridging effect, water dispersion of fibers undergoes preliminary tests without proppant. Such fluid (fiber dispersion) is pumped through a test cell with a low channel at different levels of the fluid flow rate to find a low level of the fluid flow rate. The test unit/cell and the operating principle are shown in FIG. 1A and FIG. 1B. Here, a narrow flowpath with the width of 1.0-2.0 mm is depicted. The channel height in the cell is 15-16 mm, and the length of narrow flow part (the area of possible fiber plugging) is 65 mm. The efficient injection rate is set by the pump and is selected at a level above 0.15 m/s or above 0.10 m/s.

In other embodiments of this disclosure, the behavior of treatment fluid laden with fibers and proppant was estimated by the pattern of proppant settling in a long flowpath (simulation of hydraulic fracture). The regularities of proppant settling and fiber bridging (channel plugging by a blend of fibers and particles) were estimated by accumulation of settled proppant at the bottom of flowpath. The main experimental parameters are: injection of treatment fluid by means of pump at a temperature of 25° C. through a channel with a vertical (the height is 0.5 m) slot of width 1-2 mm and length 3 m. A fluid comprising two types of fibers and one type of proppant is injected at flow rates through a slot at a level of 0.30 m/s and at a level of 0.15 m/s. In so doing, the resulting proppant distribution in the channel volume is compared with the initial distribution of proppant in case of fluid with proppant dispersion but without fibers.

To study the proppant behavior in a long flow-through cell, the flow part walls are made of transparent material which allows estimating proppant settling at the bottom. A reduction in proppant settling owing to fiber dispersion in the carrier fluid is estimated by reduction of settled material at the channel bottom. The effect of fiber bridging (partial plugging) is observed in such cell as a reduction in the total fluid flow rate through the channel, which also causes a drastic buildup of proppant in the channel volume.

In the embodiments of this disclosure, the treatment fluid contains fibers with weight concentration in the range from 1.2 to 12 g/L of the total fluid volume, while this concentration expressed in oilfield units is in the range from 10 to 100 ppt (pounds per thousand gallons). In other embodiments, the concentration of dispersed fibers is in the range from 2.4 to 4.8 g/L (or in the range from 20 to 40 ppt).

In the embodiments of this disclosure, fibers in the carrier fluid are fibers with a different stiffness. The difference in fiber stiffness can be set by selection of material (the Young modulus for fiber material), the diameter of fibers and the length of fibers. The stiffness coefficient is associated in both quality and quantity with the lateral strain of fiber under a fixed load. The fiber stiffness coefficient S is described in patent U.S. Pat. No. 8,776,882 "Engineered Fibers for Well Treatments", where fibers are compared to the reference fiber with the dimensionless stiffness coefficient equal to 1: this reference fiber made of glass is 12 µm in diameter and 6 mm in length. Other samples of a single fiber can also be selected as a reference for comparison. In embodiments of this disclosure, two types of fibers added into treatment fluid have the stiffness coefficients differing by five times or more (designated accordingly as "stiff" and "non-stiff" fibers). In other words, short fibers have the stiffness coefficient higher than similar long fibers of the same material. Accordingly, fibers made of material with higher strength (high Young modulus) are classified as "stiff". The definition of the fiber stiffness coefficient and the methods of its measurement are accepted according to the description of patent U.S. Pat. No. 8,776,882 "Engineered Fibers for Well Treatments" cited herein in its entirety.

In the embodiments of this disclosure, polymer ("non-stiff") fibers are made of material that slowly degrades in downhole conditions. According to the temperature interval of polymer material degradation, a distinction is made between "low-temperature fibers", "medium-temperature fibers", "high-temperature fibers" with respective temperature intervals from 60° C. to 93° C.; from 94° C. to 149° C.; and from 150° C. to 204° C. Stiff fibers are compared with non-stiff fibers in the stiffness coefficient at the same selected temperature interval.

In an embodiment of this disclosure, degradable polymer fibers are made of polyesters. Degrading polyesters produce organic acids, so an increase in acid concentration can serve as a criterion for estimating the degree of degradation (hydrolysis) of polyester fibers. For example, it is defined that polyesters degrade at low temperatures (lower than 93° C.), if slow heating of 10 g of polymer fibers in 1 liter of deionized water reduces the water pH to the level of 3. Further, polyesters degrade at moderate temperatures (in the range from 93° C. to 149° C.), if slow heating of 10 g of polymer fibers in 1 liter of deionized water reduces the water pH to a level of 3. Further, polyesters degrade at high temperatures (in the range from 150 to 204° C.), if slow heating of 10 g of polymer (polyester) fibers in 1 liter of deionized water reduces the water pH to a level of 3. In different examples, the polyester to be used as degradable material of fibers is selected from the group comprising polylactic acid (PLA), polyglycolic acid (PGA), co-polymers or combinations thereof.

In different embodiments of this disclosure, polymer fibers can be made of the following range of synthetic and natural materials including polylactic acid, polyglycolic acid, polyethylene terephthalate, polyesters, polyamides, polycaprolactones, polybutylene succinate, polydioxanone, nylon, glass, carbonaceous compounds, wool, basalt, acryl, polyethylene, polypropylene, polyphenylene sulphide, polyvinyl chloride, polyurethane, polyvinyl alcohol, silk, cotton, cellulose and other natural fibers, as well as combinations thereof.

In addition, polymer fibers can be classified by the glass transition temperature of polymer and the melting temperature of polymer, which can be applied to estimation of the fiber stiffness coefficient in preparation of fiber suspension. In different embodiments of this disclosure, polylactic acid (PLA) has the glass transition temperature (Tg) above 20° C., or above 25° C., or above 30° C., or in the interval from 35° C. to 55° C. In different embodiments of this disclosure, polylactic acid (PLA) has the melting temperature (Tm) below 140° C., or below 160° C., or below 180° C.

In other embodiments of this disclosure, use is made of a blend of at least two types of fibers with different stiffnesses that also have finish of silicone material accounting for 0.1% to 10% of the mass of untreated (dry) fibers.

Without wishing to be bound by any theory or concept, the authors believe that silicone-finished fibers have high dispersion in aqueous fluid and show lower proneness to aggregation and fiber bridging in narrow flowpaths (such as hydraulic fractures).

Within the scope of this disclosure, such class of substances as silicone fluids (silicone-comprising fluids) should be broadly understood. Silicone fluids (or silicone oils) should be selected in liquid (and low-viscous) state at room temperature (25° C.). This is related to the procedure of application of liquid silicone coating (finishing) onto ready fibers. When commercial technology of silicone fluid application is used, fibers are passed through special immersion baths, following which surface-treated fibers are squeezed between rolls and dried. Then, silicone-finished fibers are cut to the length (1-12 mm) and packed for storage.

According to another technology, fibers being already chopped to the required size are brought into contact with low viscosity silicone fluid (light silicone oil). For example, fibers are soaked in silicone fluid (or silicone-comprising fluid), and excess treatment fluid is removed. Alternatively, fibers are subjected to contact with silicone oil aerosol (using a silicone fluid sprayer) with continuous blending of fiber mass, which ensures partial coating of fibers with silicone fluid. Temperature and duration of fiber drying after contact with light silicone oil depends on the fiber material and type of diluent (drying conditions do not reduce the strength of fibers). Silicone-finished fibers become slick by the feel ("slick fibers").

Liquid silicone polymer (silicone oil) is selected from the class of linear polysiloxanes, cyclic polysiloxanes, branched polysiloxanes, and blends thereof. In particular, a silicone polymer known as dimethicone (light silicone oil) is used to finish polymer fibers by spraying dimethicone aerosol. Liquid silicone polymer pertains to the class of polydimethylsiloxanes (PDMS). In order to reduce the viscosity of silicone fluid (a prerequisite to aerosol spraying), a neutral low viscosity diluent can be employed.

The diluent for silicone fluid is selected from the following classes: light hydrocarbons (C5-C8), freons, alcohols, glycols and ethers thereof, fluorocarbon liquids and other low viscosity fluid carriers compatible with the fiber material and silicone (neutral diluent).

In different embodiments of this disclosure, a linear silicone polymer is used. Such linear silicone has a molecular weight (Mw) of more than 250 g/mol or more than 1,000 g/mol, and less than 25,000 g/mol. The density of silicone polymer (for example, polydimethylsiloxane) at room temperature is in the range from 0.8 to 1.00 g/cm$^3$.

A blend of two types of silicone-coated fibers (silicone-finished fibers) has a high dispersion in aqueous carrier medium, and also provides for improved proppant transport (allowing to achieve a high load of proppant in the fluid) and reduces the requirements to pump power (low viscosity fluid is used). Thus, the blend of silicone-finished fibers dispersed in a low viscosity fluid improves proppant transport in hydraulic fractures. At least one type of fibers in the fiber blend can be selected from the category of low-degradable fibers under formation conditions. Non-stiff fibers are selected from the class of degradable (hydrolizable) fibers.

In different embodiments of this disclosure, the carrier fluid is presented by water with a polymer additive or salty water solution. In different embodiments of this disclosure, the carrier fluid can include low concentrations of linear (non-cross-linked) gel, i. e. water-soluble polymers such as hydroxymethyl cellulose (HMC), guar, co-polymers of polyacrylamide or derivatives thereof (for example, acrylamido-methyl-propane sulfonate polymer (AMPS)), as well as viscoelastic surfactant (VES)-based systems. The water-soluble polymer loading can be in the range of 0.12 g/L to 1.8 g/L. The VES concentration is selected below 10 mL/L.

In other embodiments of this disclosure, a fluid loss reduction agent in the form of small solid particles of size less than 10 microns is added to the carrier fluid. Alternatively, the addition of fluid loss reduction agent (small particles plug pores in the rock) can involve γ-aluminum oxide particles, silicon oxide colloid, $CaCO_3$, $SiO_2$, bentonite and others. For example, colloidal silicon oxide acts as an extra-fine fluid loss reduction agent, and it is used depending on the size of micropores in the formation.

In different embodiments of this disclosure, the carrier fluid includes salty solution, for example, sodium chloride, potassium bromide, ammonium chloride, potassium chloride, or combinations thereof.

In different embodiments of this disclosure, the treatment fluid further comprises slickwater in the form of water-soluble polymer. Also, the treatment fluid can comprise various reagents employed for formation treatment, for example, clay stabilizers, biocides, crosslinkers, polymer degradative agents, corrosion inhibitors, temperature stabilizers, surfactants or solid additives for proppant flowback control.

In different embodiments of this disclosure, the method for treating a formation penetrated by a wellbore ensures injection of the above described treatment fluid to form the hydraulic fracturing system, maintaining the fluid flow rate at a level above the fiber bridging rate, determined, for example, from laboratory tests in a flow-through cell for a fluid comprising a fiber dispersion.

In different embodiments of this disclosure, the method for treating a formation also provides for injection of proppant-free fluid slugs (clean slugs) that are injected before proppant-laden suspension in the end of hydraulic fracturing or during the wellbore flushing step. These additional slugs can contain fibers finished with silicone fluid.

The treatment fluid with a fiber blend is obtained using blenders, mixers and other conventional surface equipment, besides, pumps for blend injection and fluid circulation maintenance are used. As this takes place, the treatment fluid contains proppant dispersed in low viscosity fluid. The method provides for dispersion of blend of silicone-finished fibers with differing stiffnesses, where fibers are added in an effective amount to reduce the proppant settling rate, which is determined by settling static test. When preparing a fiber blend, non-stiff fibers accounting for 50-90% of the total mass of fibers are loaded into a blending machine, and stiff fibers are added in the amount remaining to the total mass of fibers.

Without wishing to be bound by any model or theory to describe behavior of dispersed fibers, it is believed that adding a small amount of stiff fibers to non-stiff (soft) fibers ("binary fiber blend") increases the dispersion capacity of the total fiber blend in the carrier fluid. Meanwhile, a small proportion of stiff fibers (10-20%) does not increase the fluid flow rate, at which the fiber bridging takes place. It is also desirable that the fibers of at least one type have silicone finishing, which ensures a high dispersion of fiber blend in the carrier fluid (neither bundles nor clusters of fibers are formed).

Joint usage of a fiber blend having different stiffness coefficients, and finishing of least part of fibers results in an unexpected synergistic effect, since such blend reduces the fluid flow rate at which a plug of fibers is formed (fiber bridging), while this result cannot be achieved, if one type of fibers (for example, 100% of stiff fibers or 100% of non-stiff fibers) was dispersed in the carrier fluid.

In different embodiments of this disclosure, the method for treating a formation with fluid comprising dispersed fibers can comprise injection of a sequence of slugs with different rheological properties (heterogeneous injection of fluid). In particular, injection of treatment fluid is conducted in the form of a sequence of proppant-laden and proppant-free fluid slugs. Placement of fluid slugs comprising proppant and fibers in a hydraulic fracture causes formation of pillars, thus ensuring high and stable hydraulic fracture conductivity.

EXAMPLES

In the below examples, an aqueous fluid with slickwater or fluids with a linear guar polymer were prepared on the basis of running water. 1 mL/L (1 gpt) of a concentrated solution of polymer reduction agent (co-polymer of polyacrylamide) and 2 mL/L (2 gpt) of clay swelling stabilizer were added to the aqueous fluid with slickwater. The GG fluid was prepared by diluting the linear guar gel to a concentration of 2.4 g/L (20 ppt).

To test fibers for dispersability in the carrier fluid and for proneness to fiber bridging in flowpaths, fibers with different stiffness and size and with/without silicone finishing were selected.

Also, as a comparative example, fibers made of polylactic acid (lactic acid-based polyester) with addition of silicone (joint extrusion of two polymers having different properties) were tested. For example, instead of finishing according to the disclosure, commercially prepared PLA fibers with silicone modification were selected for tests. Meanwhile, the mass fraction of silicone in such modified fibers is 0.9% (manufactured by Trevira GmbH, Germany). In so doing, medium-temperature (94-149° C.) and low-temperature (60-93° C.) PLA fibers were tested.

Fibers made of medium-temperature PLA were selected as non-stiff (soft) fibers. The concentration of fibers was selected in the range from 1.2 to 12 g/L which is a typical concentration of fibers in a treatment fluid (no problems arise in relation to fluid injection into a well). Fibers made of alkali-proof glass with diameter of 18 μm and length of 1-3 mm were selected as stiff fibers. Fibers made of untreated PLA were selected as the stiffness reference (the stiffness coefficient is equal to 1). To estimate the stiffness coefficient, we used the formula $S=E \times d^4/W \times l^3$, where E is the Young modulus for the fiber material, d is the fiber diameter, l is the fiber length, and W is a force causing fiber bending.

The Table 1 presents the fiber parameters (with and without finishing) that have passed the tests.

TABLE 1

Parameters of fibers for testing

| | Fibers | | | | | |
|---|---|---|---|---|---|---|
| | NSF0 | NSF1 | NSF2 | FM | SF0 | SF1 |
| Fiber material and coating | PLA, 100% | PLA, 99%, silicone 1% | PLA, 96% silicone 4% | Extrusion of two polymers: PLA, 99.1% and silicone 0.9% | Glass, 100% | Glass, 99%, silicone 1% |
| Finishing by silicone (weight percent) | No | Dimethicone, 1% | Dimethicone, 4% | No | No | Dimethicone, 1% |
| Diameter | 12 μm | 12 μm | 12 μm | 12.4 μm | 18 μm | 18 μm |
| Length | 6 mm | 6 mm | 6 mm | 6.5 mm | 2 mm | 2 mm |
| Stiffness coefficient (stiff/non-stiff) | 1 | 1 | 1 | 1.5 | 250 (stiff) | 250 (stiff) |

The legend for the fiber samples in the Table 1: NSF0—non-stiff fibers with zero finishing; NSF1—non-stiff fibers with silicone finishing 1; NSF2—non-stiff fibers with finishing 2; FM—fibers modified, SF0—stiff fibers with zero finishing; SF1—stiff fibers with finishing 1.

The following procedure was used for finishing of fibers marked as F1 or F2: a portion of chopped fibers was weighed. A polydimethylsiloxane (PDMS) fluid (a finishing low viscosity agent) was pored in an aerosol dispenser. This fluid is also known as dimethicone or "light silicone oil". The density of PDMS fluid is 0.96 g/cm³, the molecular weight of liquid polymer is within the range of 250-25,000 g/mol. The molecular formula of silicone fluid is $[C_2H_6OSi]_n$. The viscosity of silicone fluid at 25° C. was 6.5 mPas. The viscosity of liquid finishing agent was reduced by adding a neutral diluent (hexane). The fibers were treated by PDMS fluid, then silicone-finished fibers were dried at temperature of 40° C. for 2-3 hours. After this, repeated weighing of treated fibers was performed to determine the relative amount of silicone coating. Polymer and glass fibers with silicone coating that accounted for 1% or 4% of weight gain in treated fibers were selected for testing.

Example 1

Dispersability of Fibers in the Treatment Fluid

In this example, the fibers and their blends form Table 1 were compared for dispersability. To accomplish this, a portion of fibers was stirred up in fluid AA (water with slickwater) for 3 minutes using a mixer (500 rpm). The concentration of polyacrylamide slickwater was 0.5 wt % with neutral pH. The concentration of fibers in fluid AA was 10 g/L. After this, the resulting volume of fiber-comprising fluid was transferred to a transparent glass, and the fluid appearance immediately after suspension stirring was compared with that 3 to 4 hours later. Visual comparison allowed a qualitative estimation of fiber dispersion according to three categories: A—cloudy fluid with indistinguishable individual fibers, without fiber bundles or deposits; B—semi-transparent fluid, wherein separate bundles of fibers are visible, while suspension remains stable during 3 to 4 hours; C—many fiber bundles, while the concentration of fibers near the bottom of glass is markedly higher than in the rest of fluid.

Fibers without finishing (marked with F0 in the Table) had the dispersion degree C. (the lowest one). A Comparative Example of modified fibers (FM) from a blend of two polymers has the dispersion category B. Fibers finished with silicone fluid (NSF1 and NSF2) has the class B-A dispersability. Unlike batches of fibers of the same type, blends of finished fibers NSF1+SF1 or NSF2+SF1 (stiff fibers accounted for 15-20% in the fiber blend) showed a stable high level of class A dispersability (a homogeneous suspension of fibers). However, stiff fibers (10%) without finishing in a fiber blend also improves the dispersability of the blends of fibers in the short term. The example demonstrates that such factors as silicone finishing and the use of different-stiffness fibers provide the highest dispersability (A) for fibers in aqueous fluid. No bundles of clusters of fibers can be seen in the glass with dispersed fibers. Non-dispersed fibers in other compositions created the possibility of fiber bridging occurrence (at a high concentration of fibers and/or low flow rate).

Example 2

Test for the Proppant Settling Rate in a Fluid with Dispersed Fibers

A static test for the proppant settling rate under static conditions at a temperature of 25° C. was conducted for the fibers and blends thereof from Table 1 for 90 minutes, as described above. 12/18 mesh ceramic proppant with a concentration of 4 pounds per gallon of fluid was selected. A portion of ceramic proppant was added to test fluid GG with dispersed fibers of different types. Fibers with zero finishing (clean) and blends of finished fibers (more than 40 wt %) and untreated fibers were tested.

The tests showed that silicone finishing of one (or two) types of fibers has little effect on the dynamics of the settled proppant proportion calculated from the above formula. The total weight concentration of the fibers of different types dispersed in test fluid GG (linear guar gel with a polymer concentration of 2.4 g/L) has an effect on the proppant settling rate in the static test with measuring cylinder. The effective amount of fibers dispersed in the test fluid to reduce the proppant settling rate is estimated as the concentration of fibers, at which proppant settling at the cylinder bottom is not completed over 90 minutes of the test.

Example 3

Minimum Acceptable Fiber Dispersion Flow Rate

For this example, a fluid was prepared in the form of linear guar gel with a concentration of 2.4 g/L (fluid GG) and with the total concentration of fibers at a level of 4.8 g/L. Suspensions of fibers of the same type and blends of fibers with different types of stiffness were compared at a fixed concentration of the fiber blend at a level of 4.8 g/L. The types of fibers to be tested are described in Table 1 (stiff/ non-stiff and with finishing/with zero finishing). When a blend of finished and non-finished fibers was tested, the weight proportion of finished fibers in the blend accounted for at least 40% (for example, 50% of silicone-finished fibers in column 6 of Table 2).

To determine the threshold of fiber bridging development (the phenomenon of partial channel plugging that causes an increase of the pressure difference in the channel), we used the experiment cell shown in FIG. 1A and FIG. 1B. Suspension of fibers in low viscosity fluid was pumped into the experimental cell at a suspension flow rate in the range of 10 to 800 mL/min; the suspension of fibers was pumped through for 30 seconds and more (so that the total volume of pumped fluid was at a level of 500 mL). A drastic pressure increase in the hydraulic system was indicative of the fiber plugging in the narrow space of the cell, i.e., in the flow-through slot with the width of 1-2 mm. The fluid with fibers was tested in the experimental cell (FIG. 1A-1B) without addition of proppant. Separate tests showed that addition of proppant (with a concentration up to 120 g/L) did not change the pattern of fiber bridging phenomenon. If no fiber plug was formed in the slot/channel, this was indicated by the "−" symbol in experimental Table 2. The fact of plug formation was indicated by the "+" symbol.

A test stand with a long vertical channel (not shown) was used to visualize the suspension flow comprising blends of fibers and proppant in the fluid based on non-cross-linked guar gel. The test stand was composed of two parallel glass panels (with the length of 3 m and the height of 0.5 m) that form a vertical slot (an analogue of a hydraulic fracture) of width 1-2 mm. Visualization was carried out with a suspension flow rate in the range from 0 to 50 L/min. A set of paired transparent cells allows arranging a complex flow pattern with L-, T-, and X-shaped geometry of flow.

The results of revealing the fiber plug formation effect in a narrow 1-mm slot are given in Table 2.

TABLE 2

Fiber plugging for suspension of different fibers (suspended in guar gel with a concentration of 2.4 g/L at 25° C.). The fiber concentration is 4.8 g/L.

| | | Selection of fibers (stiff, non-stiff, finishing) | | | | | |
|---|---|---|---|---|---|---|---|
| Suspension flow rate, mL/min | Linear velocity, cm/sec | NSF0 (100%) | NSF1 (100%) | SF0 (100%) | NSF1 (50%) + SF0 (50%) | NSF1 (85%) + SF1 (15%) | FM (100%) |
| (1) | (2) | (3) | (4) | (5) | (6) | (7) | (8) |
| Silicone finishing (Yes/No) | | No | Yes | No | Yes/No | Yes/Yes | No |
| 100 | 11.1 | + | + | + | + | + | + |
| 200 | 22.2 | + | + | + | + | + | + |
| 300 | 33.3 | + | + | + | + | − | − |
| 400 | 44.4 | + | − | + | − | − | − |
| 500 | 55.6 | +/− | − | + | − | − | − |
| 600 | 66.7 | − | − | − | − | − | − |
| 700 | 77.8 | − | − | − | − | − | − |

Note:
see the coding for designation of fiber types in Table 1 (Example 1).

The test results for suspension of fibers of the same type and with two stiffness types show that a downward trend of the fiber bridging occurrence takes place for silicone-finished fibers with different stiffness coefficients. Column (7) of Table 2 demonstrates the results of finishing two types of fibers differing in stiffness: non-stiff fibers with silicone finishing (85% of the total mass of fibers) and stiff fibers with silicone finishing (15% of the total mass of fibers). Therewith, the proppant settling rate in static tests varied by no more than 20% for all types of fiber suspensions. On the other hand, the fiber finishing effect exerts an influence on the proppant settling rate and on the probability of fiber bridging occurrence (at a low flow rate of fiber-coing fluid). The experiments have demonstrated that prevention of fiber bridging takes place for a fluid comprising dispersion of non-stiff fibers with silicone finishing blended with stiff fibers (with or without finishing). An effective amount of dispersed fibers for prevention of fiber bridging is defined as the concentration of fibers, at which pressure in the flow-through cell during injection of the entire test fluid slug does not increase for thirty minutes. The test was repeated up to three times.

Example 3

Silicone Finishing of Natural Fibers

Similar finishing was performed for natural fibers. Thus, cellulose fibers (a product of the cellulose industry) of 3-4 mm in length, impregnated with PDMS fluid (finishing of 4% of the total fiber mass) were tested. Cellulose fibers were classed as non-stiff (flexible) fibers. A fiber blend was produced from 90% of silicone-finished cellulose fibers (non-stiff fibers) and 10% of non-finished glass fibers (stiff fibers with the length from 2 to 3 mm).

Pumping of silicone-finished cellulose fibers (90%) blended with stiff fibers (10%) reduced the threshold of fiber bridging occurrence as compared to a similar blend of non-finished (clean) fibers: in the tests the flow rate of suspension of these fibers (a concentration of 5 g/L in fluid GG) decreased from the initial level of 200 mL/min (untreated fibers) to a fluid flow rate level of 100 mL/min (a blend of finished and non-finished fibers). This example demonstrates the advantage of silicone finishing that can be provided for a wide range of fibers (including natural fibers).

It is apparent that the above embodiments shall not be regarded as a limitation of the patent claims scope. It is clear for a person skilled in the art that it is possible to introduce many changes to the technique described above without departing from the principles of the claimed disclosure.

The invention claimed is:

1. A treatment fluid, comprising: a low viscosity carrier fluid with a viscosity less than 50 mPas at a shear rate of 170 $sec^{-1}$ at a temperature of 25° C.; a proppant dispersed in the low viscosity carrier fluid; and a binary blend of first and second fibers dispersed homogeneously in the low viscosity carrier fluid, wherein the first fibers are stiff and the second fibers are non-stiff, and at least 40% of the binary blend of first and second fibers are finished with only a linear silicone having a density at room temperature between 0.8 and 1.0 g/cm$^3$.

2. The fluid of claim 1, wherein the linear silicone is selected from a group of linear polysiloxanes with molecular weights between 250 g/mol and 25,000 g/mol.

3. The fluid of claim 1, wherein the stiff and non-stiff fibers have stiffness coefficients that differ by five times or more.

4. The fluid of claim 3, wherein the non-stiff fibers are finished with the linear silicone.

5. The fluid of claim 1, wherein the low viscosity carrier fluid is a linear gel or slickwater.

6. The fluid of claim 1, wherein the fluid contains from 0.06 to 1 kg/L of proppant per the total volume of the low viscosity carrier fluid.

7. The fluid of claim 1, wherein the binary blend of first and second fibers is dispersed in the low viscosity carrier fluid in an effective amount for reducing a proppant settling rate in the low viscosity carrier fluid.

8. The fluid of claim 1, wherein the binary blend of first and second fibers is dispersed in the low viscosity carrier fluid in an effective amount to prevent-fiber bridging.

9. The fluid of claim 1, wherein the fluid contains from 1.2 to 12 g/L of the binary blend of first and second fibers per the total volume of the low viscosity carrier fluid.

10. The fluid of claim 1, wherein the non-stiff fibers are polyester fibers.

11. The fluid of claim 10, wherein the polyester fibers comprise polylactic acid, polyglycolic acid, co-polymers of polylactic acid and polyglycolic acid, and combinations thereof.

12. The fluid of claim 1, wherein the binary blend of first and second fibers comprise polylactic acid, polyglycolic acid, polyethylene terephthalate, polyesters, polyamides, polycaprolactones, polybutylene succinate, polydioxanone, nylon, glass, carbonaceous compounds, wool, basalt, acryl, polyethylene, polypropylene, polyphenylene sulphide, polyvinyl chloride, polyurethane, polyvinyl alcohol, cotton, cellulose and other natural fibers, and combinations thereof.

13. A method for treating a subterranean formation penetrated by a wellbore, the method comprising: injecting a treatment fluid until hydraulic fractures are formed, wherein the treatment fluid contains: a low viscosity carrier fluid with a viscosity less than 50 mPas at a shear rate of 170 $sec^{-1}$ and a temperature of 25° C.; a proppant dispersed in the low viscosity carrier fluid; and a binary blend of first and second fibers dispersed homogeneously in the low viscosity carrier fluid, wherein the first fibers are stiff and the second fibers are non-stiff, and at least 40% of the binary blend of first and second fibers are finished with only a linear silicone, wherein the finishing is performed by aerosol application of silicone-comprising liquids; and injecting the treatment fluid at an effective flow rate to prevent fiber bridging in the well.

14. The method of claim 13, wherein the at least 40% of the binary blend of first and second fibers having the silicone finishing are finished with a silicone fluid selected from a group of linear polysiloxanes with molecular weights between 250 g/mol and 25,000 g/mol.

15. The method of claim 13, wherein the stiff and non-stiff fibers have stiffness coefficients that differ by five times or more.

16. The method of claim 13, wherein the low viscosity carrier fluid is a linear gel or slickwater.

17. The method of claim 13, wherein the binary blend of first and second fibers is dispersed in the low viscosity carrier fluid in an effective amount to reduce a proppant settling rate in the low viscosity carrier fluid.

18. The method of claim 13, wherein the blend of first and second fibers is dispersed in the low viscosity carrier fluid in an effective amount to prevent fiber bridging.

* * * * *